US011545157B2

(12) United States Patent
Wang et al.

(10) Patent No.: US 11,545,157 B2
(45) Date of Patent: Jan. 3, 2023

(54) SPEAKER DIARTZATION USING AN END-TO-END MODEL

(71) Applicant: Google LLC, Mountain View, CA (US)

(72) Inventors: Quan Wang, New York, NY (US); Yash Sheth, Sunnyvale, CA (US); Ignacio Lopez Moreno, New York, NY (US); Li Wan, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 111 days.

(21) Appl. No.: 16/617,219

(22) PCT Filed: Apr. 15, 2019

(86) PCT No.: PCT/US2019/027519
§ 371 (c)(1),
(2) Date: Nov. 26, 2019

(87) PCT Pub. No.: WO2019/209569
PCT Pub. Date: Oct. 31, 2019

(65) Prior Publication Data
US 2020/0152207 A1 May 14, 2020

Related U.S. Application Data

(60) Provisional application No. 62/661,498, filed on Apr. 23, 2018.

(51) Int. Cl.
*G10L 17/18* (2013.01)
*G10L 15/26* (2006.01)
(Continued)

(52) U.S. Cl.
CPC .............. *G10L 17/18* (2013.01); *G10L 15/26* (2013.01); *G10L 17/04* (2013.01); *G06K 9/6246* (2013.01);
(Continued)

(58) Field of Classification Search
CPC ........ G10L 15/16; G10L 17/00; G06K 9/6246
See application file for complete search history.

(56) References Cited

U.S. PATENT DOCUMENTS

2015/0310863 A1 10/2015 Chen et al.
2016/0140956 A1* 5/2016 Yu ........................... G10L 15/16
704/240
(Continued)

FOREIGN PATENT DOCUMENTS

EP 2048656 B1 * 2/2010 ............. G10L 17/04
WO WO-2007116281 A * 10/2007 ............. G10L 17/00

OTHER PUBLICATIONS

European Patent Office; Communication Pursuant to Article 94(3) EPC issued in Application No. 19720314.4; 4 pages; dated Sep. 10, 2020.
(Continued)

*Primary Examiner* — Feng-Tzer Tzeng
(74) *Attorney, Agent, or Firm* — Middleton Reutlinger

(57) ABSTRACT

Techniques are described for training and/or utilizing an end-to-end speaker diarization model. In various implementations, the model is a recurrent neural network (RNN) model, such as an RNN model that includes at least one memory layer, such as a long short-term memory (LSTM) layer. Audio features of audio data can be applied as input to an end-to-end speaker diarization model trained according to implementations disclosed herein, and the model utilized to process the audio features to generate, as direct output over the model, speaker diarization results. Further, the end-to-end speaker diarization model can be a sequence-to-sequence model, where the sequence can have variable length. Accordingly, the model can be utilized to generate speaker diarization results for any of various length audio segments.

15 Claims, 7 Drawing Sheets

(51) Int. Cl.
*G10L 17/04* (2013.01)
*G10L 21/0216* (2013.01)
*G06K 9/62* (2022.01)
*G10L 15/16* (2006.01)
*G10L 17/00* (2013.01)

(52) U.S. Cl.
CPC .............. *G10L 15/16* (2013.01); *G10L 17/00* (2013.01); *G10L 2021/02165* (2013.01)

(56) References Cited

U.S. PATENT DOCUMENTS

2016/0283185 A1    9/2016  McLaren et al.
2017/0148433 A1*   5/2017  Catanzaro .............. G06N 3/084
2017/0337924 A1*  11/2017  Yu .......................... G10L 17/18

OTHER PUBLICATIONS

European Patent Office; Examination Report issued in Application No. 19720314.4; 4 pages; dated Mar. 31, 2020.
Variani, E. et al. "Deep Neural Networks for Small Footprint Text-Dependent Speaker Verification"; 2014 IEEE International Conference on Acoustics, Speech and Signal Processing; pp. 4052-4056; May 4, 2014.
Wang, Q. et al. "Speaker Diarization with LSTM"; 2018 IEEE International Conference on Acoustics, Speech and Signal Processing; pp. 5239-5243; Apr. 15, 2018.
Wan, L. et al. "Generalized End-to-End Loss for Speaker Verification"; arxiv.org, Cornell University Library; 6 pages; Oct. 28, 2017.
European Patent Office; International Search Report and Written Opinion of Ser. No. PCT/US2019/027519; 15 pages; dated Jun. 27, 2019.
Chowdhury, F. et al. "Attention-Based Models for Text-Dependent Speaker Verification;" Cornell University; www.arXiv.org; arXiv.1710.10470v3; 5 pages; dated Jan. 31, 2018.
Heigold, G. et al. "End-to-End Text-Dependent Speaker Verification;" arXiv:1509.08062; 5 pages; submitted to ICASSP 2016; published Sep. 2015.
European Patent Office; Communication Pursuant to Article 94(3) EPC issued in Application No. 19720314.4; 4 pages; dated Apr. 1, 2021.
Intellectual Property India; Examination Report issued in Application No. 202027050591; 6 pages; dated Sep. 24, 2021.
European Patent Office; Intention to Grant issued in Application No. 19720314.4; 52 pages; dated Jul. 7, 2021.

\* cited by examiner

SPEAKER DIARTZATION USING AN END-TO-END MODEL

BACKGROUND

Speaker diarization is a branch of audio signal analysis that involves portioning an input audio stream into homogenous segments according to speaker identity. It answers the question of "who spoke when" in a multi-speaker environment. For example, speaker diarization can be utilized to identify that a first segment of an input audio stream is attributable to a first human speaker (without particularly identifying who the first human speaker is), a second segment of the input audio stream is attributable to a disparate second human speaker (without particularly identifying who the first human speaker is), a third segment of the input audio stream is attributable to the first human speaker, etc. Speaker diarization has a wide variety of applications including multimedia information retrieval, speaker turn analysis, and audio processing.

A typical speaker diarization system usually consists of four steps: (1) speech segmentation, where the input audio is segmented into short sections that are assumed to have a single speaker, and the non-speech sections are filtered out; (2) audio embedding extraction, where specific features are extracted from the segmented sections; (3) clustering, where the number of speakers is determined, and the extracted audio embeddings are clustered into these speakers; and optionally (4) resegmentation, where the clustering results are further refined to produce the final diarization results.

With such a typical speaker diarization system, errors can be introduced at each step, and can propagate to further steps, thereby causing erroneous diarization results and thereby adversely impacting further applications that may rely on the erroneous diarization results. For example, speech segmentation can rely on a voice activity detector (VAD) in performing the speech segmentation, and the VAD can introduce errors. Also, for example, errors can additionally or alternatively be introduced in speech segmentation as a result of low resolution of long segments and/or as a result of short segments having insufficient audio to produce accurate audio embeddings. As another example, audio embeddings can be generated locally without using any global information, which can additionally or alternatively introduce errors. As yet another example, clustering of the audio embeddings can additionally or alternatively introduce errors, as it involves unsupervised learning where accuracy is supposed to be low.

SUMMARY

Techniques are described herein for training and/or utilizing an end-to-end speaker diarization model. In various implementations, the model is a recurrent neural network (RNN) model, such as an RNN model that includes at least one memory layer, such as a long short-term memory (LSTM) layer. Memory layers include one or more memory units to which input can be sequentially applied and, at each iteration of applied input, the memory unit(s) can be utilized to calculate a new hidden state based on the input of that iteration and based on a current hidden state (that can be based on input(s) of prior iteration(s)). In some implementations, a memory unit can be an LSTM unit. In some implementations, additional or alternative memory unit(s) may be utilized such as a gated recurrent unit ("GRU").

Audio features of audio data can be applied as input to an end-to-end speaker diarization model trained according to implementations disclosed herein, and the model utilized to process the audio features to generate, as direct output over the model, speaker diarization results. Further, the end-to-end speaker diarization model can be a sequence-to-sequence model, where the sequence can have variable length. Accordingly, the model can be utilized to generate speaker diarization results for any of various length audio segments.

As one example, a sequence of audio data frames 1-N can be generated for corresponding audio data. Each of the audio data frames can be a portion of the audio data, such as a 25 millisecond or other duration portion. Frame features of the audio data frames can be determined, such as Mel-frequency cepstral coefficients (MFCCs) and/or other features. For example, MFCCs can be determined for frame 1, MFCCs can be determined for frame 2, MFCCs can be determined for frame 3, etc. The frame features can then be applied, in the sequence, as input to a trained speaker diarization model, to generate a sequence of outputs that each include a corresponding probability for each of N permutation invariant speaker labels. For example, frame features of audio data frame 1 can be applied initially as input to generate N probabilities, where each of the N probabilities is for a corresponding one of the N speaker labels; frame features of audio data frame 2 can be applied next as input to generate N probabilities, where each of the N probabilities is for a corresponding one of the N speaker labels; etc. It is noted that while the generated N probabilities for audio data frame 2 are specific to audio data frame 2, they will be contingent on the processing of audio data frame 1, as the model can be an RNN model. The N probabilities for audio data frame 1 can be utilized to assign a speaker label to audio data frame 1, the N probabilities for audio data frame 2 can be utilized to assign a speaker label to audio data frame 2, etc. Further, an indication of the speaker labels and their assignments can be transmitted to one or more additional components for further processing of the audio data based on the speaker labels.

Use of an end-to-end speaker diarization model according to implementations disclosed herein can result in generating more robust and/or more accurate speaker diarization results as compared to other speaker diarization techniques. For example, various errors that are introduced with other techniques, such as those mentioned in the background above, can be mitigated through training and utilization of an end-to-end speaker diarization model according to implementations disclosed herein. Additionally or alternatively, use of an end-to-end speaker diarization model according to implementations disclosed herein can enable speaker diarization to be performed in a more computationally efficient manner as compared to prior speaker diarization techniques. For instance, computationally intensive clustering of prior techniques can be eliminated in various implementations of speaker diarization disclosed herein. Additionally or alternatively, in various implementations disclosed herein the end-to-end speaker diarization model is trained to enable generation of speaker diarization results where lack of any human speakers (e.g., presence of silence and/or background noise) is itself indicated as a unique speaker in the speaker diarization results. This can obviate the need for a separate voice activity detector (VAD), which can consume excess computational resources and which is required for various other speaker diarization techniques (and which can introduce errors in those prior techniques).

In various implementations, an end-to-end speaker diarization model is utilized to generate speaker diarization results for audio data that is submitted (e.g., via an application programming interface (API)) as part of a speech processing request. In some of those implementations, the speaker diarization results are generated in response to the speech processing request, and are transmitted back to the computing device that transmitted the speech processing request, or transmitted back to a related computing device.

In various implementations, an end-to-end speaker diarization model is utilized to generate speaker diarization results for audio data captured by microphone(s) of a client device that includes an automated assistant interface for an automated assistant. For example, the audio data can be a stream of audio data that captures spoken utterance(s) from one or more speaker(s), and the model can be utilized to generate online speaker diarization results for the stream of audio data. In some of those various implementations, the generated speaker diarization results are utilized by one or more components of the automated assistant in further processing of the stream of audio data. For example, an automatic speech recognition (ASR) component, such as a voice-to-text engine, can utilize the generated speaker diarization results in performing speech recognition based on the audio data. For instance, one or more speech recognition models may be "reset" or otherwise adjusted in response to the transitions between speakers that are indicated by the diarization results. It will thus be appreciated that more accurate speaker diarization may, for instance, facilitate more accurate speech recognition processing. In an automated assistant context, this may serve to improve the accuracy with which the automated assistant responds to commands.

The above description is provided as an overview of various implementations disclosed herein. Those various implementations, as well as additional implementations, are described in more detail herein.

In some implementations, a method of speaker diarization is provided that includes generating a sequence of audio data frames for corresponding audio data. The method further includes, for each of the audio data frames, and in the sequence: applying frame features for the audio data frame as input to a trained recurrent neural network (RNN) model, and processing the frame features for the audio data frame using the trained RNN model to generate output, of the trained RNN model, that includes a corresponding probability for each of a plurality of permutation invariant speaker labels. The method further includes, for each of a plurality of the audio data frames, assigning a corresponding one of the plurality of speaker labels to the audio data frame based on the corresponding probabilities. The method further includes transmitting an indication of the speaker labels and their assignments to at least one additional component for further processing of the audio data based on the speaker labels.

These and other implementations of the technology disclosed herein can include one or more of the following features.

In some implementations, the trained RNN model includes a long short-term memory (LSTM) layer and/or an affine layer as a final layer. When the affine layer is included, it can have an output dimension that conforms to the plurality of speaker labels.

In some implementations, the trained RNN model is trained to enable detection of different human speakers and to enable detection of a lack of any human speakers. In some of those implementations, the method further includes determining that a given speaker label of the plurality of speaker labels corresponds to the lack of any human speakers. In some versions of those implementations, determining that the given speaker label corresponds to the lack of any human speakers includes: performing further processing of one or more of the audio data frames having the assigned given speaker label to determine that the one or more of the audio data frames each include silence or background noise. In some of those versions, transmitting the indication of the speaker labels and their assignments to the at least one additional component for further processing of the audio data based on the speaker labels includes: identifying, in the indication of the speaker labels and their assignments, portions of the audio data that include silence or background noise.

In some implementations, the frame features for each of the audio data frames include Mel-frequency cepstral coefficients of the audio data frame.

In some implementations, the method further includes receiving, via one or more network interfaces, the audio data as part of a speech processing request transmitted utilizing an application programming interface. In some of those implementations, generating the sequence of audio data frames, applying the frame features of the audio data frames, processing the frame features of the audio data frames, and assigning the speaker labels to the audio data frames are performed in response to receiving the speech processing request—and transmitting the indication of the speaker labels and their assignments is via one or more of the network interfaces, and is in response to the speech processing request.

In some implementations, the audio data is streaming audio data that is based on output from one or more microphones of a client device that includes an automated assistant interface for interfacing with an automated assistant, and the streaming audio data is received in response to invocation of the automated assistant via the client device. In some versions of those implementations, transmitting the indication of the speaker labels and their assignments to at least one additional component for further processing of the audio data based on the speaker labels includes transmitting the indication of the speaker labels and their assignments to an automated assistant component of the automated assistant. In some of those versions, the automated assistant component of the automated assistant includes an automatic speech recognition (ASR) component that processes the audio data to generate text corresponding to the audio data. For example, the ASR component can utilize the speaker labels to identify a transition between speakers in the audio data and, based on the transition, alter processing of the audio data that follows the transition. In some additional or alternative versions, the at least one automated assistant component of the automated assistant includes a natural language understanding component. In some additional or alternative versions, the automated assistant generates a response based on the further processing of the audio data based on the speaker labels, and causes the response to be rendered at the client device.

In some implementations, a method implemented by one or more processors is provided and includes: identifying a training instance that includes: a sequence of audio data frames for corresponding audio data, and ground truth speaker labels for each of the audio data frames. The method further includes, for each of the audio data frames, and in the sequence: applying frame features for the audio data frame as input to a recurrent neural network (RNN) model, and processing the frame features for the audio data frame using the RNN model to generate output, of the trained RNN model, that includes a corresponding probability for each of the ground truth speaker labels. The method further includes generating a loss as a function of: the generated probabilities for the audio data frames, and the ground truth speaker labels. The method further includes updating one or more weights of the RNN model based on the generated loss.

These and other implementations of the technology disclosed herein can include one or more of the following features.

In some implementations, generating the loss includes comparing the generated probabilities to the ground truth speaker labels by considering all possible permutations of the speaker labels. In some of those implementations, comparing the generated probabilities to the ground truth speaker labels by considering all possible permutations of the speaker labels includes determining the minimal-sum solution to an assignment problem that is based on the all possible permutations of the speaker labels.

In some implementations, the loss is a dynamic loss.

In some implementations, the loss is an exhaustive loss.

In some implementations, the method further includes: subsequent to updating the one or more weights of the RNN model based on the generated loss, and based on additional generated losses based on additional training instances: using the RNN model in performing speaker diarization of subsequent audio data.

In some implementations, a method implemented by one or more processors is provided and includes: receiving a stream of audio data that is based on output from one or more microphones of a client device that includes an automated assistant interface for an automated assistant. The stream of audio data is optionally received in response to invocation of the automated assistant with the automated assistant interface. The method further includes generating a sequence of audio data frames as the stream of audio data is received. The method further includes, for each of the audio data frames, and in the sequence: applying frame features for the audio data frame as input to a trained recurrent neural network (RNN) model; and processing the frame features for the audio data frame using the trained RNN model to generate output, of the trained RNN model, that includes a corresponding probability for each of a plurality of speaker labels. The method further includes, for each of a plurality of the audio data frames, assigning a corresponding one of the plurality of speaker labels to the audio data frame based on the corresponding probabilities. The method further includes using, by the automated assistant, the assigned speaker labels in processing of the stream of audio data.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
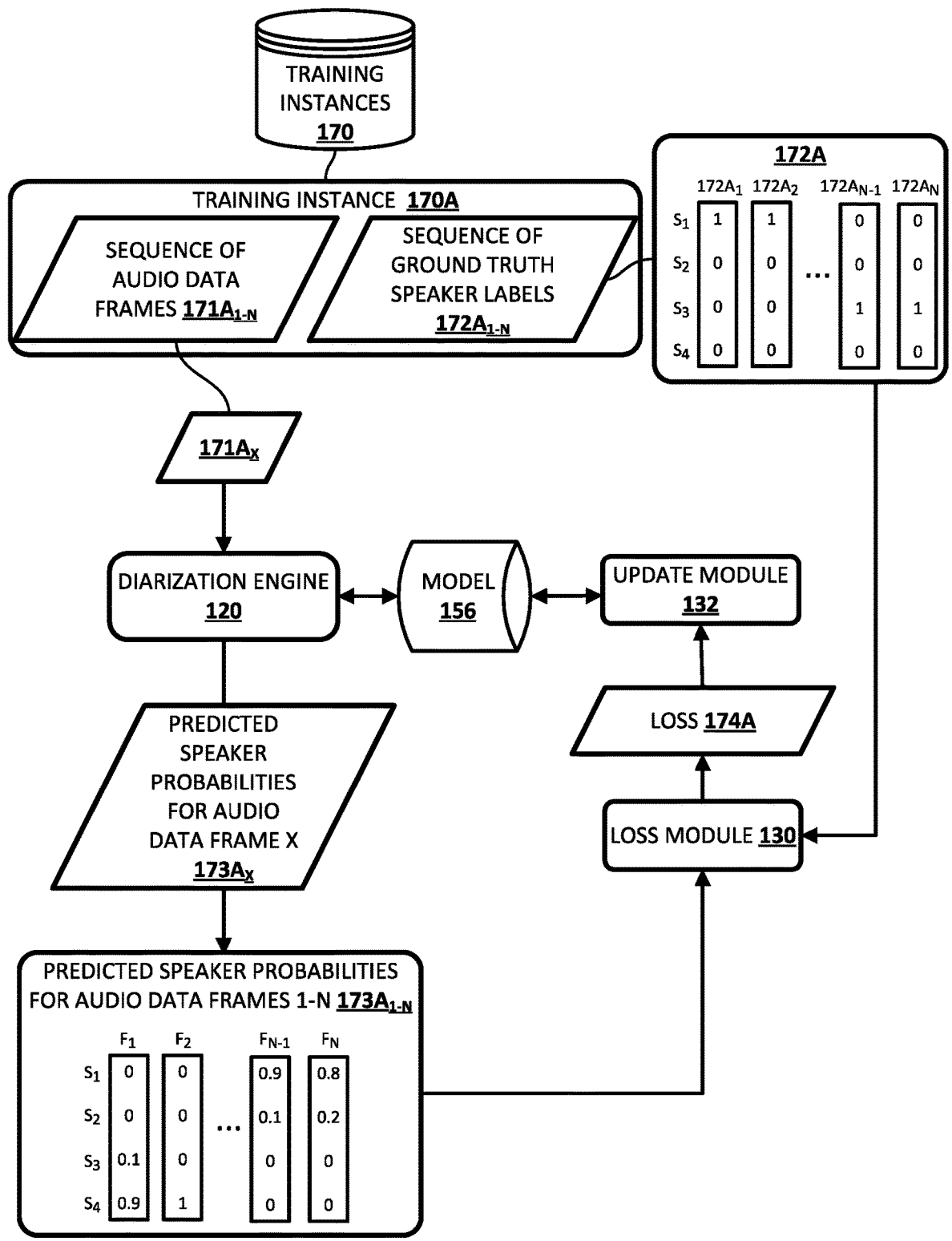
FIG. 1 illustrates an example of training an end-to-end speaker diarization model according to various implementations disclosed herein.

Turning initially to FIG. 1, an example of training an end-to-end speaker diarization model is illustrated. In FIG. 1, the end-to-end speaker diarization model is referenced as model 156. The model 156 can be an RNN model that includes at least one memory layer, such as a long short-term memory (LSTM) layer. As described herein, the model 156 can be trained to accept, as input at each iteration, frame features of an audio data frame for that iteration and to be used to generate, as output at each iteration, a corresponding probability, for each of N speaker labels, for that audio data frame. Accordingly, frame features, for a sequence of audio data frames, can be sequentially applied to the trained model 156 to sequentially generate probabilities for each of N speaker labels, where each iteration of probabilities for each of the N speaker labels corresponds to the audio data frame applied for that iteration. The sequence of probabilities for the N speaker labels can be utilized to assign a corresponding one of the N speaker labels to each of the audio data frames. Further, speaker diarization results that correspond to the assigned speaker labels can be provided for the audio data.

The model 156 can have input dimensions that conform to frame features, of audio data frames, that are to be applied as input sequentially to the model 156. Further, the model 156 can have output dimensions that conform to a maximum quantity of speaker labels that the model 156 is being trained to predict. For example, in the example of FIG. 1 the model 156 is being trained to predict a maximum of four speaker labels, and can have a one by four output.

In FIG. 1, a training instance 170A of training instances database 170 is illustrated. The training instance 170A includes a sequence of audio data frames $171A_{1-N}$ and a corresponding sequence of ground truth speaker labels $172A_{1-N}$. Each of the audio data frames $171A_{1-N}$ is a portion of corresponding audio data, and the audio data frames $171A_{1-N}$ are in a sequence that conforms with their sequence in the corresponding audio data. For example, the initial audio data frame $171A_1$ is the first frame of the corresponding audio data, the second audio data frame $171A_2$ is the second frame of the corresponding audio data, etc.

Each of the ground truth speaker labels in the sequence of ground truth speaker labels $172A_{1-N}$ corresponds to a corresponding one of the audio data frames $171A_{1-N}$. For example, first ground truth speaker labels $172A_1$ are for initial audio data frame $171A_1$, second ground truth speaker labels $172A_2$ are for the second audio data frame $171A_2$, etc. As illustrated in FIG. 1, each of the ground truth speaker labels $172A_{1-N}$ includes a "1" for the speaker label that is active for the corresponding audio data frame, and a "0" for all other speaker labels. For example, speaker label $S_1$ is active for audio data frames $171A_1$ and $171A_2$ (as indicated by $172A_1$ and $172A_2$), and speaker label $S_2$ is active for audio data frames $171A_{N-1}$ and $171A_N$ (as indicated by $172A_{N-1}$ and $172_N$). The speaker labels can be manually annotated by a human reviewer and/or can be automatically applied. For example, the speaker labels can be automatically applied based on fully captioned audio and/or audio-visual data (e.g., aligning the speaker labels of the captioning to the audio data) and/or based on which phones are actively transmitting audio during a multi-phone communication.

In various implementations, the ground truth speaker labels $172A_{1-N}$ are an S*N binary matrix R, where S equals the number of rows in the matrix R and corresponds to the maximum quantity of speaker labels that the model is being trained to predict, and where N equals the number of columns in the matrix R and corresponds to the number of audio data frames $171A_{1-N}$ (since ground truth speaker labels are provided for each of the audio data frames). Each column N of the S*N binary matrix R can be a one-hot column in that it includes a single row with a "1" (or other "positive" label), and all other rows of the column are "0" (or other "negative" label).

As described herein, in various implementations a given ground truth speaker label can be for a corresponding human speaker, or can be for a lack of any human speaker (e.g., background noise and/or silence). As also described herein, in various implementations, the ground truth speaker labels are permutation invariant and the model 156 is trained to generate permutation invariant speaker labels. Permutation invariance can mean that permutations of speaker labels do not matter in the diarization problem. For example, with permutation invariance, the following two hypothesis ($H_1$ and $H_2$) are equivalent, where rows represent speaker labels and columns represent audio data frames. That is, in both $H_1$ and $H_2$, a given speaker is associated with audio data frames one and two, and a separate speaker is associated with audio data frames three and four.

$$H_1 = \begin{bmatrix} 0 & 0 & 1 & 1 \\ 0 & 0 & 0 & 0 \\ 1 & 1 & 0 & 0 \end{bmatrix} \equiv H_2 = \begin{bmatrix} 0 & 0 & 0 & 0 \\ 0 & 0 & 1 & 1 \\ 1 & 1 & 0 & 0 \end{bmatrix}$$

In training the model 156 based on the training instance 170A, the diarization engine 120 sequentially applies frame features of the sequence of audio data frames $171A_{1-N}$ as input to the model 156, to sequentially generate predicted probabilities for audio data frames 1-N $173A_{1-N}$. The sequential application of the frame features of the audio data frames $171A_{1-N}$ in FIG. 1 is represented by $171A_X$ and the sequential generation of predicted probabilities is represented by predicted speaker probabilities for audio data frame X $173A_X$. For example, the diarization engine 120 can apply frame features of the first audio data frame $171A_1$ as input to the model 156 at an initial iteration and generate, based on processing the input over the model 156, predicted speaker probabilities $173A_1$ for the first audio data frame $171A_1$. The predicted speaker probabilities $173A_1$ for the first audio data frame $171A_1$ are illustrated in column $F_1$ of $173A_{1-N}$ of FIG. 1. Continuing with the example, the dia-rization engine 120 can next apply frame features of the second audio data frame $171A_2$ as input to the model 156 at a second iteration and generate, based on processing the input over the model 156, predicted speaker probabilities $173A_2$ for the second audio data frame $171A_2$. The predicted speaker probabilities $173A_2$ for the second audio data frame $171A_2$ are illustrated in column $F_2$ of $173A_{1-N}$ of FIG. 1. It is noted at the second iteration that only frame features for the second audio data frame $171A_2$ are being applied as input. However, the output generated using the model 156 can be influenced by the previously processed frame features for the first audio data frame $171A_1$, as the model 156 can be an RNN model that includes one or more memory units, as described herein.

Processing the sequence of audio data frames $171A_{1-N}$ using the model 156 results in predicted probabilities for audio data frames 1-N $171A_{1-N}$. The loss module 130 generates a loss 174A as a function of: predicted probabilities for audio data frames 1-N $171A_{1-N}$ and sequence of ground truth speaker labels $172A_{1-N}$. The loss 174A is provided to the update module 132, which updates the model 156 based on the loss. For example, the update module 132 can update the model 156 based on the loss and using backpropagation (e.g., gradient descent).

The loss module 130 can utilize a loss function that takes into account the permutation invariance of the predicted probabilities for audio data frames 1-N $171A_{1-N}$ and sequence of ground truth speaker labels $172A_{1-N}$. For example, the loss function can compare the predicted probabilities for audio data frames 1-N $171A_{1-N}$ to the sequence of ground truth speaker labels $172A_{1-N}$ by considering all possible permutations of the speaker labels. In some implementations, this can be achieved by determining the minimal-sum solution to an assignment problem that is based on the all possible permutations of the speaker labels.

In some implementations, the loss module 130 utilize a cross-entropy tensor P between the predicted probabilities for audio data frames 1-N $171A_{1-N}$ and the sequence of ground truth speaker labels $172A_{1-N}$. The tensor P can be represented as $$P = \{P_{ijt}\}_{1 \leq i \leq S, 1 \leq j \leq S, 1 \leq t \leq N}$$

$$P_{ijt} = -R_{it} \log H_{jt}$$

where S represents the quantity of speakers (e.g., the number of rows) and N represents the quantity of audio data frames (e.g., the number of columns), where R represents the sequence of ground truth speaker labels $172A_{1-N}$, and where H represents the predicted probabilities for audio data frames 1-N $171A_{1-N}$. In some implementations, the loss can then be determined as the minimal-sum solution to the standard assignment problem, which can be solved by the Hungarian Algorithm and/or utilizing other technique(s). However, in various implementations it is desirable to train the model 156 utilizing gradient descent, in which case the loss must be differentiable.

In some implementations, a dynamic loss is utilized as a differentiable loss. In some of those implementations, the dynamic loss is generated by dynamically solving the assignment problem during optimization and at each iteration. With such an approach, with a deterministic mapping, the dynamic loss is the sum of N elements, and each element is differentiable.

In some implementations, an exhaustive loss is utilized as a differentiable loss. In some of those implementations, the exhaustive loss is generated by considering the S! mappings from reference labels (the sequence of ground truth speaker labels 172A$_{1-N}$) to predicted labels (the predicted probabilities for audio data frames 1-N 171A$_{1-N}$). When computing the loss, if S (the maximum quantity of speakers) is relatively small, all mappings could be considered. For example, where S=3, one of the binary mapping matrices could be:

$$M_k = \begin{bmatrix} 0 & 1 & 0 \\ 1 & 0 & 0 \\ 0 & 0 & 1 \end{bmatrix}$$

and the loss could be defined as:

$$L = \sum_{i=1}^{N} \sum_{i-j}^{N} \sum_{k=1}^{N!} M_k \odot \hat{P}$$

where $\odot$ is matrix element-wise multiplication. In brief, this is the sum over all (non-optimal) solutions to the assignment problem.

While FIG. 1 only illustrates a single training instance 170A in detail, it is understood that training instances database 170 can include a large quantity of additional training instances. The additional training instances can include training instances of various lengths (e.g., based on various durations of audio data), training instances based on various sources of audio data (e.g., captioned videos, phone calls), and training instances with various quantities of unique speakers (e.g., some can include only one unique speaker, others two unique speakers, yet others three unique speakers, etc.). Moreover, it is understood that a large quantity of the additional training instances will be utilized to train model 156.

Figure 2:
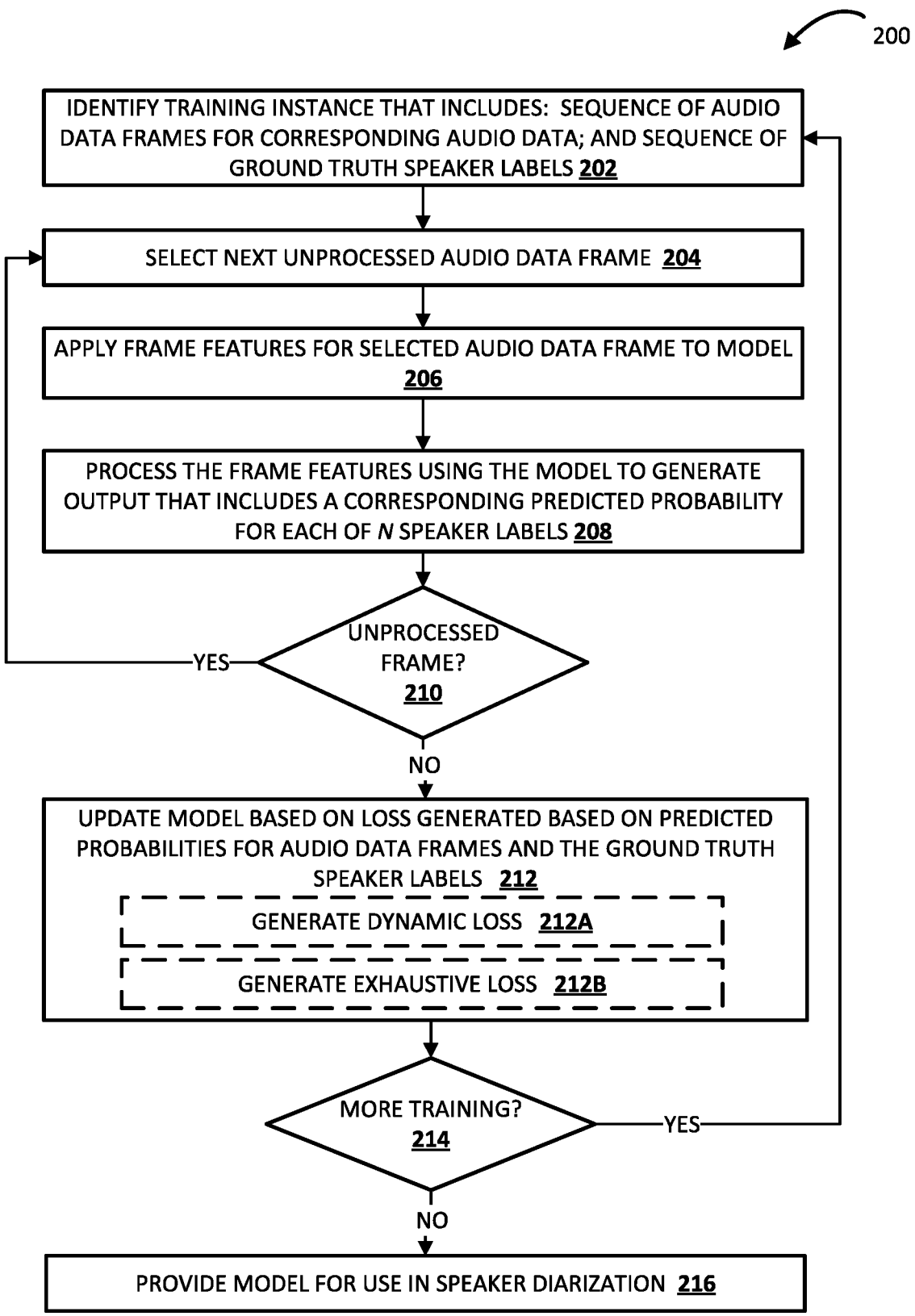
FIG. 2 depicts a flowchart illustrating an example method of training an end-to-end speaker diarization model according to various implementations disclosed herein.

Turning now to FIG. 2, an example method 200 is illustrated of training an end-to-end speaker diarization model, according to implementations disclosed herein. For convenience, the operations of the flow chart of FIG. 2 are described with reference to a system that performs the operations. This system may include various components of various computer systems, such as one or more GPU(s), CPU(s), and/or TPU(s). Moreover, while operations of method 200 are shown in a particular order, this is not meant to be limiting. One or more operations may be reordered, omitted or added.

At block 202, the system identifies a training instance that includes a sequence of audio data frames for corresponding audio data, and that includes a sequence of ground truth speaker labels.

At block 204, the system selects the next unprocessed audio data frame in the sequence of audio data frames identified at block 202. For example, at an initial iteration of block 204, the system selects the first audio data frame, at a second iteration of block 204 the system selects the second audio data frame, etc.

At block 206, the system applies frame features for the selected audio data frame to the speaker diarization model. The speaker diarization model can be an RNN model as described herein. The frame features can include, for example, MFCCs and/or other features. In some implementations, the frame features can be computed by the system based on analysis of the selected audio data frame. In some other implementations, the frame features may be included with the sequence of audio data frames in the training instance, or the sequence of audio data frames in the training instance could themselves be the frame features in lieu of the underlying audio data.

At block 208, the system processes the frame features using the speaker diarization model to generate output that includes a corresponding predicted probability for each of N speaker labels. For example, the system can apply the frame features as input to the speaker diarization model and process the frame features using memory layer(s) and/or affine layer(s) of the speaker diarization model. In some implementations, a final layer of the speaker diarization model is an affine layer, such as a Softmax layer, that is used to generate the probabilities for the speaker labels based on output generated over upstream layer(s) of the model. The system stores (e.g., in memory) the generated predicted probabilities for use in block 212 (described below).

At block 210, the system determines whether there are any remaining unprocessed frames from the sequence of audio data frames of the training instance. If so, the system proceeds back to block 204, selects the next unprocessed audio data frame, the proceeds to blocks 206 and 208 based on the next unprocessed audio data frame. Through multiple iterations of blocks 204, 206, 208, and 210, the system generates a sequence of predicted probabilities for the N speaker labels. Namely, for each of the audio data frames of the sequence of the training instance identified at block 202, the system generates a corresponding predicted probability for each of N speaker labels.

When, at block 210, the system determines there are not any remaining unprocessed frames from the sequence of audio data frames of the training instance, the system proceeds to block 212.

At block 212, the system updates the model based on a loss that is generated based on the predicted probabilities for the audio data frames (i.e., the predicted probabilities generated via multiple iterations of block 208) and the sequence of ground truth speaker labels included in the identified training instance at block 202. In some implementations, updating the model comprises performing backpropagation of the model based on the loss to update one or more weights of the model. In some of those implementations, the loss is a differentiable loss. In some implementations where the loss is a differentiable loss, block 212 includes sub-block 212A or sub-block 212B. At sub-block 212A, the system generates a dynamic loss. For example, the system can generate the dynamic loss by dynamically solving the assignment problem during optimization and at each iteration. At sub-block 212B the system generates an exhaustive loss. For example, the system can generate the exhaustive loss by considering all mappings from the ground truth speaker labels to the predicted probabilities.

The system then proceeds to block 214, and determines whether to perform more training of the speaker diarization model. If so, the system proceeds back to block 202, selects an additional training instance, then performs multiple iterations of blocks 204, 206, 208, and 210 based on the additional training instance, then performs an additional iteration of block 212. In some implementation, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although method 200 is described with respect to a non-batch learning technique, batch learning may additionally and/or alternatively be utilized.

If, at an iteration of block 202, the system determines not to perform more training, the system can proceed to block 216 where the system provides the model for use in speaker diarization. This can include, for example, one or more uses of the model that are described below with respect to FIGS. 3 through 6.

Figure 3:
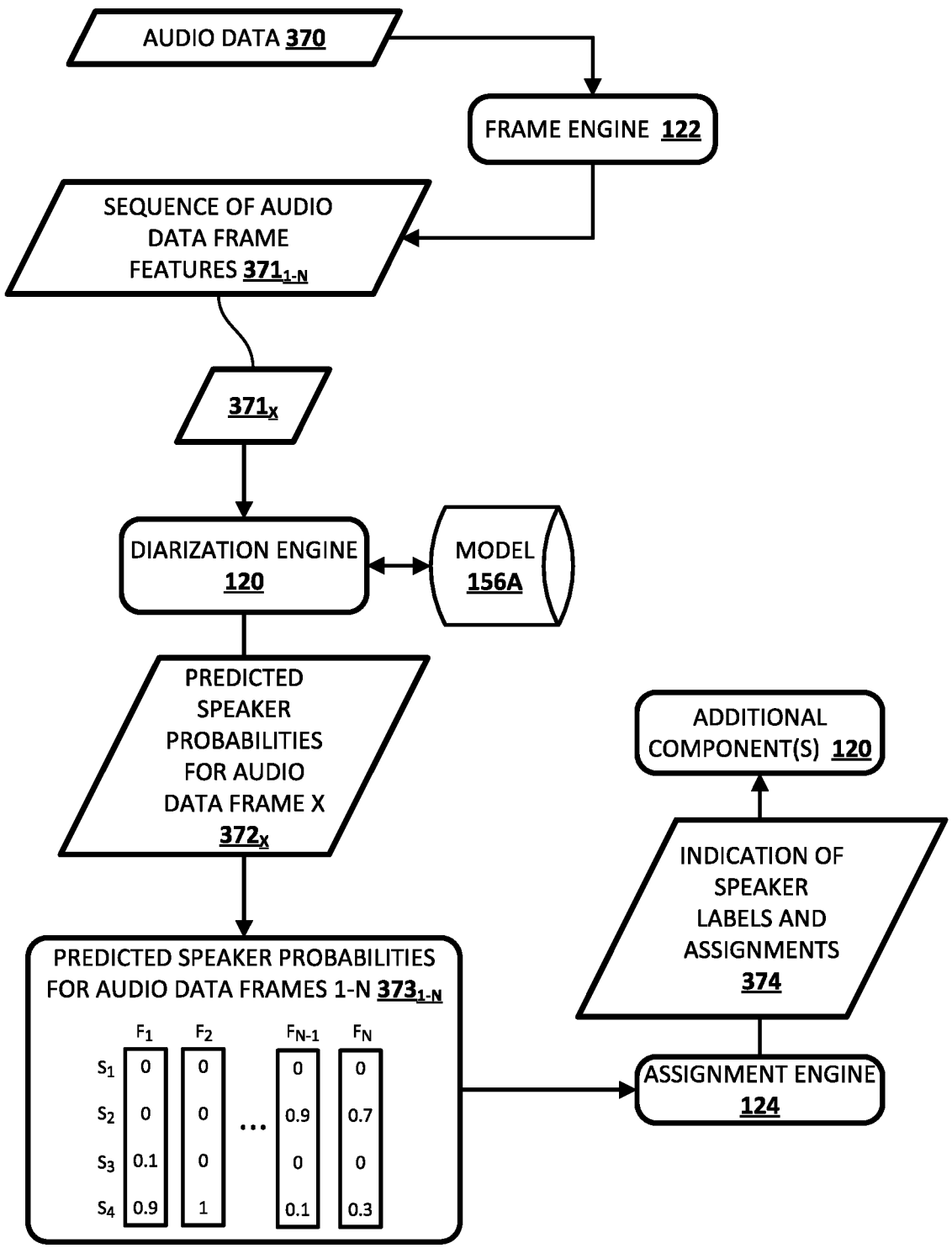
FIG. 3 illustrates an example of performing speaker diarization of audio data, using a trained end-to-end speaker diarization model, according to various implementations disclosed herein.

FIG. 3 illustrates an example of performing speaker diarization of audio data, using a trained end-to-end speaker diarization model, according to various implementations disclosed herein. In FIG. 3, the end-to-end speaker diarization model is referenced as model 156A. The model 156A can be the same as the model 156 of FIG. 1, but is designated with an "A" to indicate that it has been trained (e.g., trained as described with respect to FIG. 1 and/or FIG. 2).

A frame engine 122 processes audio data 370 to generate a sequence of audio data frame features $371_{1-N}$. Each of the audio data frame features of the sequence $371_{1-N}$ is for a corresponding audio data frame of the audio data 370. For example, first audio data frame features $371_1$ are features of a first audio data frame of the audio data 370, second audio data frame features $371_2$ are feature of a second audio data frame of the audio data 370, etc. The audio data 370 can be, for example, streaming audio data that is processed by frame engine 122 in an online manner (e.g., in real-time or in near real-time) or non-streaming audio data that has been previously recorded and provided to frame engine 122.

The diarization engine 120 sequentially applies frame features of the sequence of audio data frame features $371_{1-N}$ as input to the model 156, to sequentially generate predicted probabilities for audio data frames 1-N $373_{1-N}$. The sequential application of the frame features of the audio data frames $371_{1-N}$ in FIG. 3 is represented by $371_X$ and the sequential generation of predicted probabilities is represented by predicted speaker probabilities for audio data frame X $373_X$. For example, the diarization engine 120 can apply frame features of the first audio data frame $371_1$ as input to the model 156 at an initial iteration and generate, based on processing the input over the model 156, predicted speaker probabilities $373_1$ for the first audio data frame $371_1$. The predicted speaker probabilities $373_1$ for the first audio data frame $371_1$ are illustrated in column $F_1$ of $373_{1-N}$ of FIG. 3. Continuing with the example, the diarization engine 120 can next apply frame features of the second audio data frame $371_2$ as input to the model 156A at a second iteration and generate, based on processing the input over the model 156, predicted speaker probabilities $373_2$ for the second audio data frame $371_2$. The predicted speaker probabilities $373_2$ for the second audio data frame $371_2$ are illustrated in column $F_2$ of $373_{1-N}$ of FIG. 3. It is noted at the second iteration that only frame features for the second audio data frame $371_2$ are being applied as input. However, the output generated using the model 156A can be influenced by the previously processed frame features for the first audio data frame $371_1$, as the model 156 can be an RNN model that includes one or more memory units, as described herein.

Processing the sequence of audio data frames $371_{1-N}$ using the model 156 results in predicted probabilities for audio data frames 1-N $373_{1-N}$. It is noted that the predicted probabilities for audio data frames 1-N $373_{1-N}$ can be generated in an online manner. That is, the predicted probability for each audio data frame can be generated directly based on processing of that audio data frame using the model 156A, without consideration of any subsequent audio data frames. Resegmentation can optionally occur after generating all of the probabilities, but the probabilities themselves can nonetheless be generated in an online manner. Also, in many implementations, further processing of a given audio data frame of audio data can occur on the basis of its online generated probability, before probabilities have even been generated for one or more subsequent audio data frames of the audio data.

The assignment engine 124 can utilize the predicted probabilities to assign corresponding audio data frames based on the predicted probabilities. For example, the assignment engine 124 can assign a first speaker label to frames $F_1$ and $F_2$ based on the predicted probabilities for $S_4$ satisfying a threshold for those frames (relative to other probabilities for those frames and/or relative to a fixed value). Further, the assignment engine 124 can assign the same first speaker label to other (unillustrated) frames that also have predicted probabilities for $S_4$ that satisfy a threshold. Also, for example, the assignment engine 124 can assign the same second speaker label to other frames $F_{N-1}$ and $F_N$ based on the predicted probabilities for $S_2$ satisfying a threshold for those frames (relative to other probabilities for those frames and/or relative to a fixed value). Further, the assignment engine 124 can assign the same second speaker label to other (unillustrated) frames that also have predicted probabilities for $S_2$ that satisfy a threshold. If other (unillustrated) frames have predicted probabilities for $S_1$ and/or $S_3$ that satisfy a threshold, the assignment engine can assign corresponding speaker labels to those frames as well. Again, it is noted that the speakers $S_{1-4}$ are permutation invariant in many implementations. Accordingly, the assignment of speaker labels by the assignment engine 124 does not necessarily correspond to speakers $S_{1-4}$. Rather, the assigned speaker labels need only indicate which frames have the same speaker. As one example, the assignment engine 124 can optionally assign the same speaker labels to frames 1-4 (indicated by columns 1-4 in the matrix below) for both of following two hypothesis ($H_1$ and $H_2$), since those hypotheses are equivalent with permutation invariance.

$$H_1 = \begin{bmatrix} 0 & 0 & 1 & 1 \\ 0 & 0 & 0 & 0 \\ 1 & 1 & 0 & 0 \end{bmatrix} \equiv H_2 = \begin{bmatrix} 0 & 0 & 0 & 0 \\ 0 & 0 & 1 & 1 \\ 1 & 1 & 0 & 0 \end{bmatrix}$$

The assignment engine 124 provides an indication of the speaker labels and assignments 374 to one or more additional components 120. In some implementations, the indication 374 can include an assignment of a speaker label for each audio data frame of the audio data. In some additional or alternative implementations, the indication 374 can include assignments of speaker labels to various segments of the audio data, where each segment can correspond to one or more audio data frames. For example, the indication 374 can indicate that the 0.0-3.5 seconds segment of the audio data corresponds to a first speaker, the 3.51-5.6 seconds segment corresponds to a second speaker, that the 5.61-6.8 second segment corresponds to the first speaker, etc.

In some implementations, the indication 374 can include an assignment of a speaker label that corresponds to a lack of any human speakers (e.g., corresponds to background noise and/or silence). In some versions of those implementations, the assignment engine 124 explicitly indicates that such a speaker label corresponds to the lack of any human speakers. In some of those versions, the assignment engine 124 can determine that a given speaker label corresponds to the lack of any human speakers based on performing further processing of one or more of the audio data frames having the assigned given speaker label to determine that the one or more of the audio data frames each include silence or background noise. This can be necessary since, in various implementations, the predicted speaker probabilities for audio data frames 1-N $373_{1\text{-}N}$ can include probabilities for a given speaker label that corresponds to the lack of any human speaker, but will not explicitly indicate that the given speaker label is one for "lack of any human speaker". In other words, the speaker labels of $373_{1\text{-}N}$ can each indicate a different speaker, but don't necessarily each identify which speaker(s) are human speakers (or particularly identify those human speakers) and/or which speaker(s) correspond to lack of any human speaker. In some implementations, the assignment engine 124 can determine that the given speaker label corresponds to the lack of any human speakers based on at least a threshold quantity and/or percentage of the audio data frames including less than a threshold volume of noise (e.g., indicating silence) and/or that at least a threshold quantity and/or percentage of the audio data frames lack any discernable spoken utterance (e.g., based on a voice-to-text engine failing to identify text (or identify with at least a threshold level of confidence) for those audio data frames).

As mentioned above, the assignment engine 124 provides the indication of the speaker labels and assignments 374 to one or more additional components 120. In some implementations, the assignment engine 124 can provide the indication 374 in an online manner (e.g., indications for portions of the audio data 370 can be provided while other portions are still being processed by the diarization engine 120). In other implementations, the assignment engine 124 can provide the indication 374 in an offline manner (e.g., only after processing of the audio data 370 is completed by the diarization engine 120).

In some implementations, the additional component(s) 120 include a client device or other computing device (e.g., a server device) and the audio data 370 is received as part of a speech processing request submitted by the computing device (or related computing device(s)). In those implementations, the diarization is performed in response to receiving the speech processing request, and the indication 374 is transmitted to the computing device in response to receiving the speech processing request. Optionally, other (unillustrated) speech processing can additional be performed in response to the speech processing request (e.g., voice-to-text processing, natural language understanding), and the indication 374 can optionally be transmitted along with results from the other speech processing.

In some implementations, the additional component(s) 120 include one or more components of an automated assistant, such as an automatic speech recognition (ASR) component (e.g., that performs voice-to-text conversion) and/or a natural language understanding component. For example, the audio data 370 can be streaming audio data that is based on output from one or more microphones of a client device that includes an automated assistant interface for interfacing with the automated assistant. The automated assistant can include (or be in communication with) the diarization engine and the assignment engine 124, and transmitting the indication 374 can include transmitting the indication to one or more other components of the automated assistant. For instance, the one or more other components can include an ASR component that utilizes the speaker labels to identify a transition between speakers in the audio data 370, and, based on the transition, alter processing of the audio data that follows the transition (e.g., "resets" one or more RNN models utilized in ASR).

Figure 4:
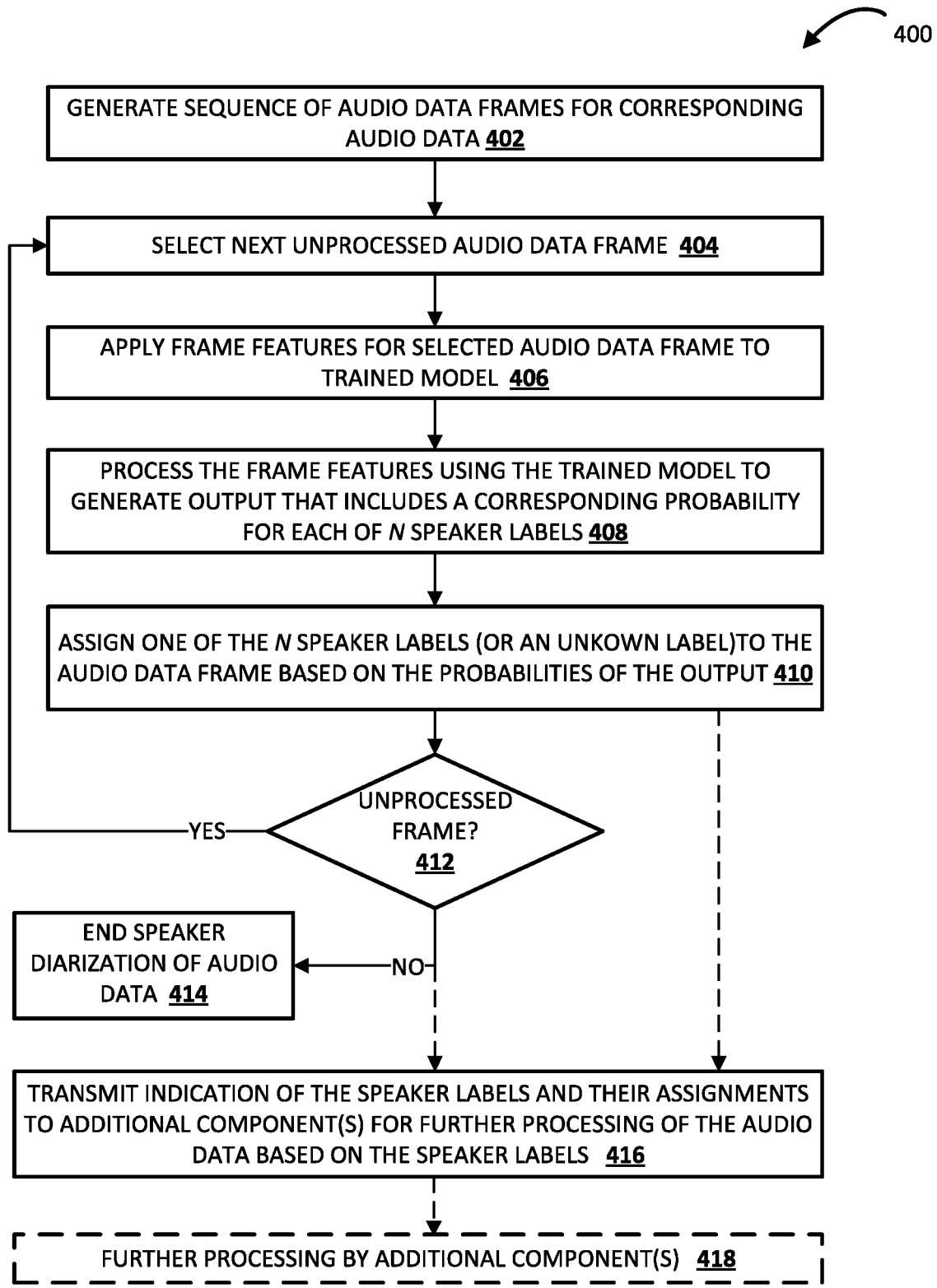
FIG. 4 depicts a flowchart illustrating an example method of performing speaker diarization of audio data, using an end-to-end speaker diarization model, according to various implementations disclosed herein.

Turning now to FIG. 4, an example method 400 is illustrated of performing speaker diarization of audio data, using an end-to-end speaker diarization model, according to various implementations disclosed herein. For convenience, the operations of the flow chart of FIG. 4 are described with reference to a system that performs the operations. This system may include various components of various computer systems, such as one or more GPU(s), CPU(s), and/or TPU(s). Moreover, while operations of method 400 are shown in a particular order, this is not meant to be limiting. One or more operations may be reordered, omitted or added.

At block 402, the system generates a sequence of audio data frames for corresponding audio data. In some implementations, the audio data is streaming audio data and the system generates the sequence of audio data as the audio data is received in the stream. In some of those implementations, one or more of the following blocks may be performed in parallel with block 402 (e.g., blocks 404-410 may be performed on an already generated audio data frame of the sequence, while block 402 is generating further audio data frame(s) for the sequence). In some other implementations, the audio data is not streaming audio data.

At block 404, the system selects a next unprocessed audio data frame in the sequence of audio data frames. For example, at an initial iteration of block 404, the system selects the first audio data frame, at a second iteration of block 404 the system selects the second audio data frame, etc.

At block 406, the system applies frame features for the selected audio data frame to a trained model. The trained model can be an RNN model trained as described herein (e.g., trained as described with respect to method 200 of FIG. 2). The frame features can include, for example, MFCCs and/or other features. In some implementations, the frame features can be computed by the system based on analysis of the selected audio data frame.

At block 408, the system processes the frame features using the trained model to generate output that includes a corresponding probability for each of N speaker labels. For example, the system can apply the frame features as input to the trained model and process the frame features using memory layer(s) and/or affine layer(s) of the trained model. In some implementations, a final layer of the trained model is an affine layer, such as a Softmax layer, that is used to generate the probabilities for the speaker labels based on output generated over upstream layer(s) of the trained model.

At block 410, the system assigns one of the S speaker labels (or an unknown label) to the audio data frame based on the probabilities of the output. For example, the system can assign, to the audio data frame, the speaker label with the highest probability as indicated by the output. In some implementations, the speaker can assign an unknown label to the audio data frame if the probabilities all fail to satisfy a threshold (e.g., a fixed threshold and/or a threshold relative to other probabilities). The system can store (e.g., in memory) the generated predicted probabilities for use in block 414 (described below).

At block 412, the system determines whether there are any remaining unprocessed frames from the sequence of audio data frames of the training instance. If so, the system proceeds back to block 404, selects the next unprocessed audio data frame, the proceeds to blocks 406, 408, and 410 based on the next unprocessed audio data frame. Through multiple iterations of blocks 404-410, the system generates a sequence of predicted probabilities for the N speaker labels, and assigns a corresponding speaker label to each of the audio data frames.

If, at an iteration of block 412, the system determines there are not any remaining unprocessed frames, the system can proceed to block 414 and end speaker diarization of the audio data received at block 402.

As indicated by the dashed arrows in FIG. 4, the system performs block 416 after a "no" determination at block 412 and/or can perform block 416 over multiple iterations (e.g., each iteration can be performed following each iteration of block 410, and at each iteration of block 416 the system can transmit a speaker label for a single audio data frame of the iteration of block 410). At block 416, the system transmits an indication of the speaker labels and their assignments to additional component(s), for further processing of the audio data based on the speaker labels. In some implementations, the additional component(s) include a client device or other computing device (e.g., a server device) and the audio data of block 402 is received as part of a speech processing request submitted by the computing device (or related computing device(s)). In some implementations, the additional component(s) include one or more components of an automated assistant, such as an automatic speech recognition (ASR) component (e.g., that performs voice-to-text conversion) and/or a natural language understanding component.

At optional block 418, further processing of the audio data is performed by the additional component(s), based on the indication of the speaker labels and their assignments.

Figure 5:
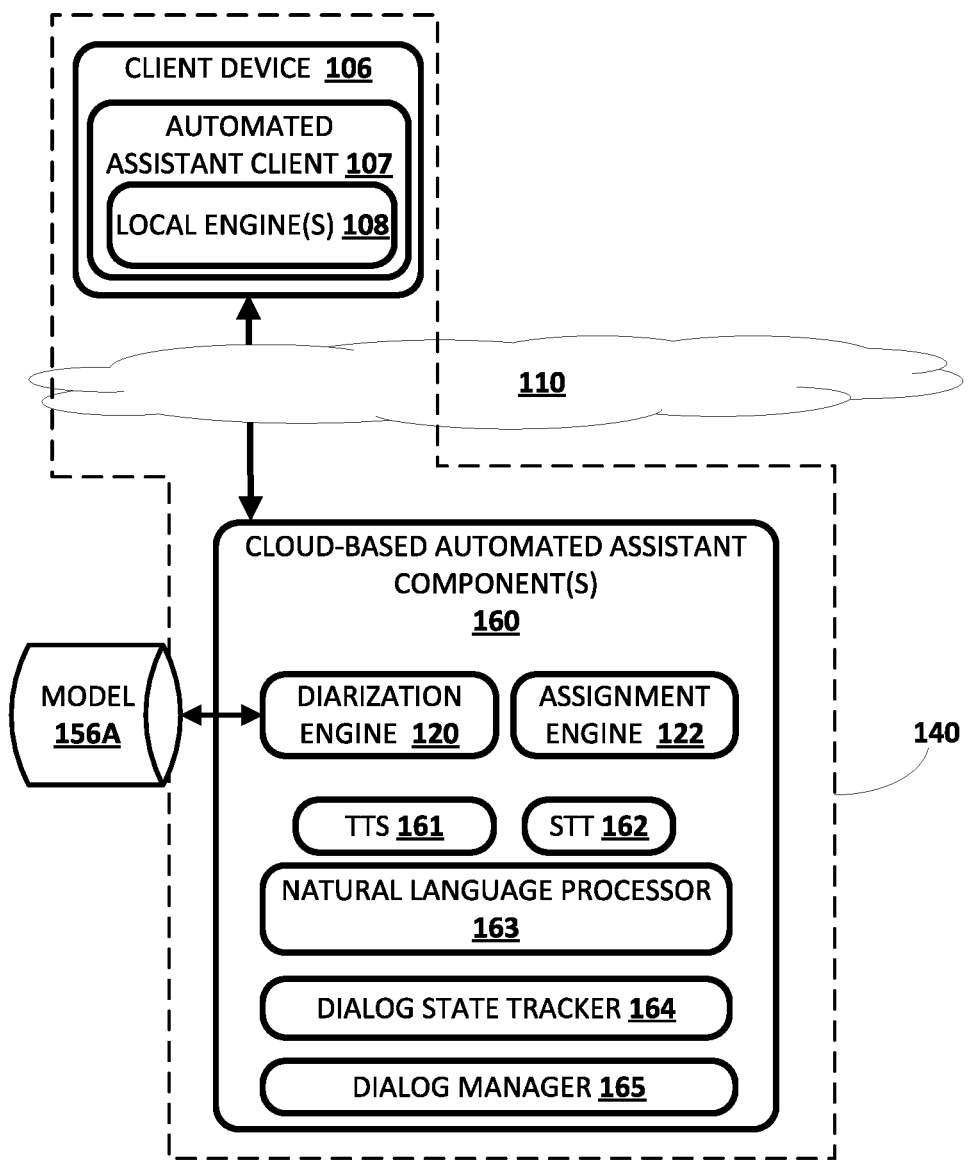
FIG. 5 is a block diagram of an example environment where speaker diarization can be performed utilizing an end-to-end speaker diarization model.
Figure 6:
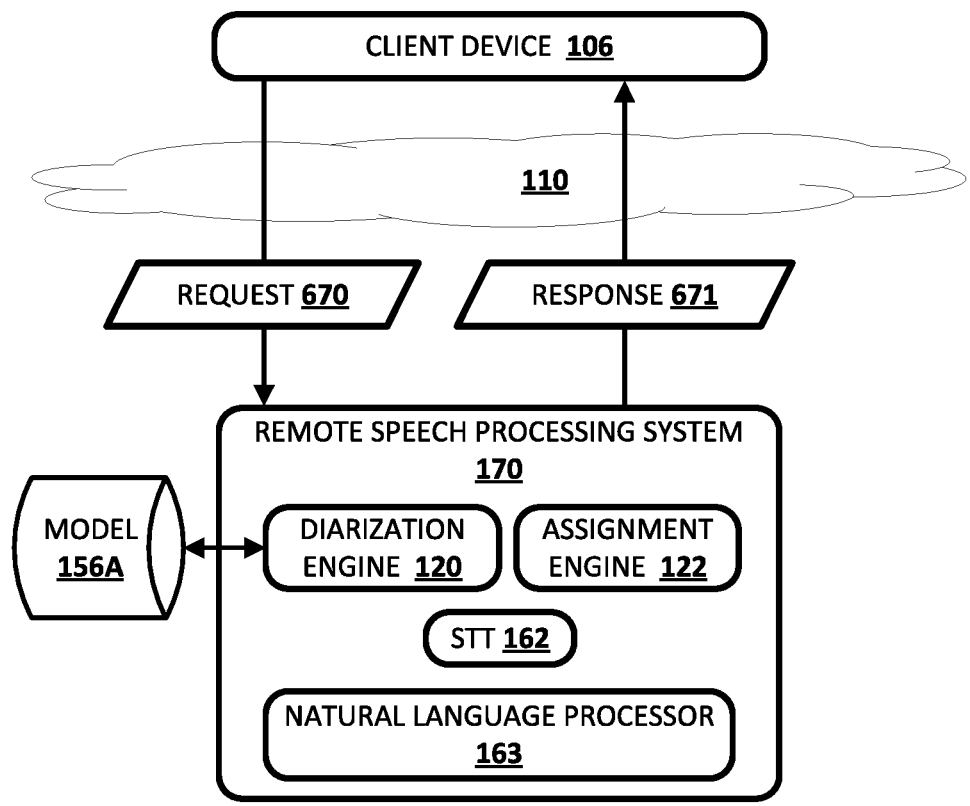
FIG. 6 is a block diagram of another example environment where speaker diarization can be performed utilizing an end-to-end speaker diarization model.

Turning now to FIG. 5 and FIG. 6, two example environments are illustrated where speaker diarization can be performed using a trained end-to-end speaker diarization model, denoted as model 156A. FIG. 5 is described initially, and includes a client computing device 106, which executes an instance of an automated assistant client 107. One or more cloud-based automated assistant components 160 can be implemented on one or more computing systems (collectively referred to as a "cloud" computing system) that are communicatively coupled to client device 106 via one or more local and/or wide area networks (e.g., the Internet) indicated generally at 110.

An instance of an automated assistant client 107, by way of its interactions with one or more cloud-based automated assistant components 160, may form what appears to be, from the user's perspective, a logical instance of an automated assistant 140 with which the user may engage in a human-to-computer dialog. An instance of such an automated assistant 140 is depicted in FIG. 5. It thus should be understood that in some implementations, a user that engages with an automated assistant client 107 executing on client device 106 may, in effect, engage with his or her own logical instance of an automated assistant 140. For the sakes of brevity and simplicity, the term "automated assistant" as used herein as "serving" a particular user will often refer to the combination of an automated assistant client 107 executing on a client device 106 operated by the user and one or more cloud-based automated assistant components 160 (which may be shared amongst multiple automated assistant clients of multiple client computing devices). It should also be understood that in some implementations, automated assistant 140 may respond to a request from any user regardless of whether the user is actually "served" by that particular instance of automated assistant 140.

The client computing device 106 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 106 may optionally operate one or more other applications that are in addition to automated assistant client 107, such as a message exchange client (e.g., SMS, MMS, online chat), a browser, and so forth. In some of those various implementations, one or more of the other applications can optionally interface (e.g., via an application programming interface) with the automated assistant 107 120, or include their own instance of an automated assistant application (that may also interface with the cloud-based automated assistant component(s) 160).

Automated assistant 140 engages in human-to-computer dialog sessions with a user via user interface input and output devices of the client device 106. To preserve user privacy and/or to conserve resources, in many situations a user must often explicitly invoke the automated assistant 140 before the automated assistant will fully process a spoken utterance. The explicit invocation of the automated assistant 140 can occur in response to certain user interface input received at the client device 106. For example, user interface inputs that can invoke the automated assistant 140 via the client device 106 can optionally include actuations of a hardware and/or virtual button of the client device 106. Moreover, the automated assistant client can include one or more local engines 108, such as an invocation engine that is operable to detect the presence of one or more spoken invocation phrases. The invocation engine can invoke the automated assistant 140 in response to detection of one of the spoken invocation phrases. For example, the invocation engine can invoke the automated assistant 140 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 140. As used herein, "invoking" the automated assistant 140 can include causing one or more previously inactive functions of the automated assistant 140 to be activated. For example, invoking the automated assistant 140 can include causing one or more local engines 108 and/or cloud-based automated assistant components 130 to further process audio data frames based on which the invocation phrase was detected, and/or one or more following audio data frames (whereas prior to invoking no further processing of audio data frames was occurring). For instance, local and/or cloud-based components can perform speaker diarization of audio data frames in response to invocation of the automated assistant 140.

The one or more local engine(s) 108 of automated assistant 140 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 106 is relatively constrained in terms of computing resources (e.g., processor cycles, memory, battery, etc.), the local engines 108 may have limited functionality relative to any counterparts that are included in cloud-based automated assistant components 160.

Cloud-based automated assistant components 160 leverage the virtually limitless resources of the cloud to perform more robust and/or more accurate processing of audio data, and/or other user interface input, relative to any counterparts of the local engine(s) 108. Again, in various implementations, the client device 106 can provide audio data and/or other data to the cloud-based automated assistant components 160 in response to the invocation engine detecting a spoken invocation phrase, or detecting some other explicit invocation of the automated assistant 140.

The illustrated cloud-based automated assistant components 160 include a cloud-based TTS module 161, a cloud-based STT module 162, a natural language processor 163, a dialog state tracker 164, and a dialog manager 165. The illustrated cloud-based automated assistant components 160 also include the diarization engine 120 that utilizes model 156A in predicting speaker probabilities for each audio data frame of audio data received from the client device 106. Further, the cloud-based automated assistant components 160 include the assignment engine 122 that can utilize the predictions to assign a speaker label to each of the audio data frames, and can provide an indication of the speaker labels and their assignments to one or more other cloud-based automated assistant components 160 (e.g., STT module 162, natural language processor 163, dialog state tracker 164, and/or dialog manager 165). The diarization engine 120, the model 156A, and the assignment engine 122 can have the same and/or similar functionality as described with respect to FIG. 3.

In some implementations, one or more of the engines and/or modules of automated assistant 140 may be omitted, combined, and/or implemented in a component that is separate from automated assistant 140. For example, in some implementations, the diarization engine 120, the assignment engine 122, and/or the model 156A can be implemented, in whole or in part, on the client device 106. Further, in some implementations automated assistant 140 can include additional and/or alternative engines and/or modules.

Cloud-based STT module 162 can convert audio data into text, which may then be provided to natural language processor 163. In various implementations, the cloud-based STT module 162 can covert audio data into text based at least in part on indications of speaker labels and assignments that are provided by the assignment engine 124. For example, the cloud-based STT module 162 can optionally utilize the speaker labels and assignments to selectively reset one or more RNN models utilized in conversion of audio data into text. For instance, memory units of such RNN models can be reset before processing of audio data frames that correspond to a speaker label that differs from a speaker label of most recently processed audio data frames.

Cloud-based TTS module 161 can convert textual data (e.g., natural language responses formulated by automated assistant 140) into computer-generated speech output. In some implementations, TTS module 161 may provide the computer-generated speech output to client device 106 to be output directly, e.g., using one or more speakers. In other implementations, textual data (e.g., natural language responses) generated by automated assistant 140 may be provided to one of the local engine(s) 108, which may then convert the textual data into computer-generated speech that is output locally.

Natural language processor 163 of automated assistant 140 processes free form natural language input and generates, based on the natural language input, annotated output for use by one or more other components of the automated assistant 140. For example, the natural language processor 163 can process natural language free-form input that is textual input that is a conversion, by STT module 162, of audio data provided by a user via client device 106. The generated annotated output may include one or more annotations of the natural language input and optionally one or more (e.g., all) of the terms of the natural language input.

In some implementations, the natural language processor 163 is configured to identify and annotate various types of grammatical information in natural language input. For example, the natural language processor 163 may include a part of speech tagger (not depicted) configured to annotate terms with their grammatical roles. Also, for example, in some implementations the natural language processor 163 may additionally and/or alternatively include a dependency parser (not depicted) configured to determine syntactic relationships between terms in natural language input.

In some implementations, the natural language processor 163 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 163 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 163 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 163 may rely on annotations from one or more other components of the natural language processor 163. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 163 may use related prior input and/or other related data outside of the particular natural language input to determine one or more annotations.

In some implementations, dialog state tracker 164 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 165 may be configured to map a current dialog state, e.g., provided by dialog state tracker 164, to one or more "responsive actions" of a plurality of candidate responsive actions that are then performed by automated assistant 140. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 140 outputting additional natural language dialog. This responsive dialog may include, for instance, requests that the user provide parameters for some action (i.e., fill slots) that dialog state tracker 164 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Turning now to FIG. 6, another example environment is illustrated where speaker diarization can be performed using a trained end-to-end speaker diarization model, denoted as model 156A. An automated assistant is not included in FIG. 6. Rather, in FIG. 6 the client device 106 does not include an automated assistant client. Further, in FIG. 6 a remote speech processing system 170 is included in lieu of cloud-based automated assistant component(s).

In FIG. 6, the client device 106 submits a request 670 via one or more local and/or wide area networks (e.g., the Internet) indicated generally at 110. The request 670 is a speech processing request and can be submitted via an API defined for the remote speech processing system 170. The request 670 can include audio data, and can optionally define type(s) of speech processing that are to be performed on the audio data in response to the request 670. The remote speech processing system 170 can handle requests from the client device 106, as well as requests from various other computing devices. The remote speech processing system 170 can be implemented, for example, on a cluster of one or more server devices.

In response to receiving the request 670, the remote speech processing system 170 performs one or more speech processing functionalities on the audio data included in the request, such as speaker diarization, and returns speech processing results in the form of a response 671 that is transmitted back to the client device 106 via network 110. For example, the remote speech processing system 170 includes the diarization engine 120 that utilizes model 156A in predicting speaker probabilities for each audio data frame of audio data received in the request 670. Further, the remote speech processing system 170 include the assignment engine 122 that can utilize the predictions to assign a speaker label to each of the audio data frames. The remote speech processing system 170 can include, in the response 671, indication of the speaker labels and their assignments for use by the client device 106 and/or other related computing devices. The diarization engine 120, the model 156A, and the assignment engine 122 can have the same and/or similar functionality as described with respect to FIG. 3.

In FIG. 6, the remote speech processing system 170 also includes STT module 162 and natural language processor 163. Those components can have the same and/or similar functionality as described above with respect to FIG. 5. In some implementations, output generated utilizing those components can additionally be included in the response 671. For example, STT module 162 can convert the audio data, received in the request 670, into text, and provide the text in the response 671. For example, the text can be included in the response 671 and the indication of the speaker labels and their assignments can be assignments of the speaker labels to the provided text. In some implementations, the STT module 162 can optionally leverage output from the diarization engine 120 and/or the assignment engine 122 in performing speech to text conversion. As another example, annotations generated by natural language processor 163 can additionally and/or alternatively be provided in the response 671.

Figure 7:
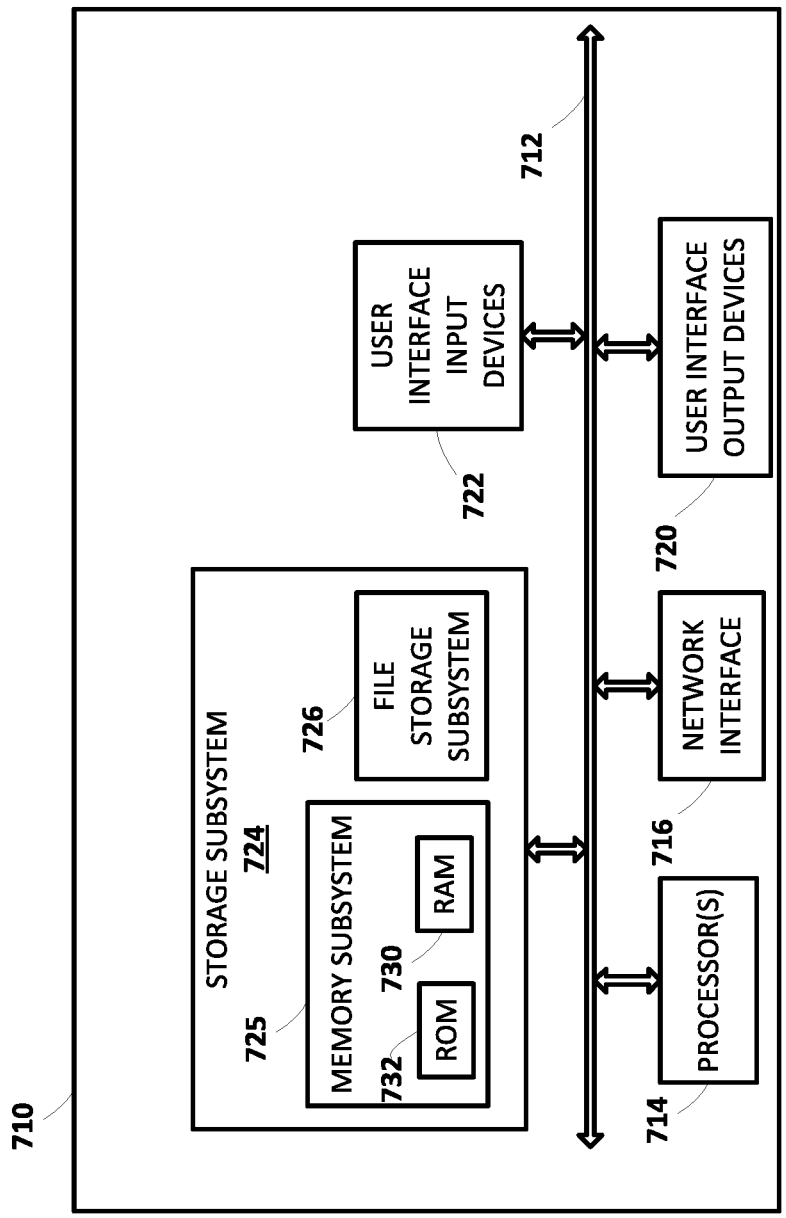
FIG. 7 illustrates an example architecture of a computing device.

FIG. 7 is a block diagram of an example computing device 710 that may optionally be utilized to perform one or more aspects of techniques described herein. For example, client device 106 can include one or more components of example computing device 710 and/or one or more server devices that implement cloud-based automated assistant components 160 and/or remote speech processing system 170 can include one or more components of example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 2, the method of FIG. 4, and/or to implement various components depicted in FIGS. 1-6.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

What is claimed is:

1. A method of speaker diarization, the method implemented by one or more processors and comprising:
generating a sequence of audio data frames for corresponding audio data;
for each of the audio data frames, and in the sequence:
applying frame features for the audio data frame as input to a trained recurrent neural network (RNN) model, and
processing the frame features for the audio data frame using the trained RNN model to generate direct output, of the trained RNN model, that includes a corresponding probability for each of a plurality of permutation invariant speaker labels, wherein the trained RNN model comprises:
a long short-term memory (LSTM) layer, and
an affine layer as a final layer, the affine layer having an output dimension that conforms to the plurality of speaker labels;
for each of a first plurality of the audio data frames, assigning a corresponding one of the plurality of speaker labels to the audio data frame in response to the corresponding probability, for the audio data frame, satisfying a threshold;
for each of a second plurality of the audio data frames, assigning an unknown label to the audio data frame in response to the corresponding probabilities, generated as direct output of the trained RNN model for the audio data frame, all failing to satisfy the threshold; and
transmitting an indication of the speaker labels, the unknown labels, and their assignments to at least one additional component for further processing of the audio data based on the speaker labels and the unknown labels.

2. The method of claim 1, wherein the trained RNN model is trained to enable detection of different human speakers and to enable detection of a lack of any human speakers.

3. The method of claim 2, further comprising:
determining that a given speaker label of the plurality of speaker labels corresponds to the lack of any human speakers, wherein determining that the given speaker label corresponds to the lack of any human speakers comprises:
performing further processing of one or more of the audio data frames having the assigned given speaker label to determine that the one or more of the audio data frames each include silence or background noise.

4. The method of claim 3, wherein transmitting the indication of the speaker labels and their assignments to the at least one additional component for further processing of the audio data based on the speaker labels comprises:
identifying, in the indication of the speaker labels and their assignments, portions of the audio data that include silence or background noise.

5. The method of claim 1, wherein the frame features for each of the audio data frames comprise Mel-frequency cepstral coefficients of the audio data frame.

6. The method of claim 1, further comprising:
receiving, via one or more network interfaces, the audio data as part of a speech processing request transmitted utilizing an application programming interface;
wherein generating the sequence of audio data frames, applying the frame features of the audio data frames, processing the frame features of the audio data frames, and assigning the speaker labels and the unknown labels to the audio data frames are performed in response to receiving the speech processing request; and wherein transmitting the indication of the speaker labels, the unknown labels, and their assignments is via one or more of the network interfaces, and is in response to the speech processing request.

7. The method of claim 1,
wherein the audio data is streaming audio data that is based on output from one or more microphones of a client device, wherein the client device includes an automated assistant interface for interfacing with an automated assistant, and wherein the streaming audio data is received in response to invocation of the automated assistant via the client device; and
wherein transmitting the indication of the speaker labels, the unknown labels, and their assignments to at least one additional component for further processing of the audio data based on the speaker labels and the unknown labels comprises transmitting the indication of the speaker labels, the unknown labels, and their assignments to an automated assistant component of the automated assistant.

8. The method of claim 7, wherein the automated assistant component of the automated assistant is an automatic speech recognition (ASR) component that processes the audio data to generate text corresponding to the audio data.

9. The method of claim 8, wherein the ASR component utilizes the speaker labels to identify a transition between speakers in the audio data and, based on the transition, alters processing of the audio data that follows the transition.

10. The method of claim 7, wherein the at least one additional component of the automated assistant includes a natural language understanding component.

11. The method of claim 7, wherein the automated assistant generates a response based on the further processing of the audio data based on the speaker labels, and causes the response to be rendered at the client device.

12. A method implemented by one or more processors, the method comprising:
receiving a stream of audio data that is based on output from one or more microphones of a client device, the client device including an automated assistant interface for an automated assistant, and the stream of audio data received in response to invocation of the automated assistant;
generating a sequence of audio data frames as the stream of audio data is received;
for each of the audio data frames, and in the sequence:
applying frame features for the audio data frame as input to a trained recurrent neural network (RNN) model;
processing the frame features for the audio data frame using the trained RN N model to generate direct output, of the trained RNN model, that includes a corresponding probability for each of a plurality of permutation invariant speaker labels, wherein the trained RNN model comprises:
a long short-term memory (LSTM) layer, and
an affine layer as a final layer, the affine layer having an output dimension that conforms to the plurality of speaker labels; and
for each of a first plurality of the audio data frames, assigning a corresponding one of the plurality of speaker labels to the audio data frame in response to the corresponding probability, for the audio data frame, satisfying a threshold;
for each of a second plurality of the audio data frames, assigning an unknown label to the audio data frame in response to the corresponding probabilities, generated as direct output of the trained RNN model for the audio data frame, all failing to satisfy the threshold; and
using, by the automated assistant, the assigned speaker labels and the assigned unknown labels in processing of the stream of audio data.

13. The method of claim 12, wherein using, by the automated assistant, the assigned speaker labels and the assigned unknown labels in processing of the stream of audio data comprises using the assigned speaker labels in performing automatic speech recognition.

14. The method of claim 12, wherein using, by the automated assistant, the assigned speaker labels and the assigned unknown labels in processing of the stream of audio data comprises using the assigned speaker labels and the assigned unknown labels in performing natural language understanding.

15. A client device, comprising:
one or more microphones;
an automated assistant interface for an automated assistant;
memory storing instructions;
one or more processors operable to execute the instructions to:
receive a stream of audio data that is based on output from the one or more microphones;
generate a sequence of audio data frames as the stream of audio data is received;
for each of the audio data frames, and in the sequence:
apply frame features for the audio data frame as input to a trained recurrent neural network (RNN) model;
process the frame features for the audio data frame using the trained RNN model to generate direct output, of the trained RNN model, that includes a corresponding probability for each of a plurality of permutation invariant speaker labels, wherein the trained RNN model comprises:
a long short-term memory (LSTM) layer, and
an affine layer as a final layer, the affine layer having an output dimension that conforms to the plurality of speaker labels; and
for each of a first plurality of the audio data frames, assign a corresponding one of the plurality of speaker labels to the audio data frame in response to the corresponding-probability, for the audio data frame, satisfying a threshold;
for each of a second plurality of the audio data frames, assign an unknown label to the audio data frame in response to the corresponding probabilities, generated as direct output of the trained RNN model for the audio data frame, all failing to satisfy the threshold; and
use, by the automated assistant, the assigned speaker labels and the assigned unknown labels in processing of the stream of audio data.

* * * * *